United States Patent
Tochigi

[19]
[11] Patent Number: 6,049,431
[45] Date of Patent: *Apr. 11, 2000

[54] ZOOM LENS

[75] Inventor: Nobuyuki Tochigi, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/773,049

[22] Filed: Dec. 24, 1996

[30] Foreign Application Priority Data

Jan. 10, 1996 [JP] Japan .................................. 8-019383

[51] Int. Cl.[7] .................................................. G02B 15/14
[52] U.S. Cl. .......................... 359/687; 359/683; 359/684
[58] Field of Search .......................... 359/687, 688–690, 359/683, 684, 676, 686

[56] References Cited

U.S. PATENT DOCUMENTS

| | | | |
|---|---|---|---|
| 4,261,648 | 4/1981 | Gobl et al. | 359/687 |
| 4,890,904 | 1/1990 | Ito | 359/687 |
| 5,155,630 | 10/1992 | Hata | 359/687 |
| 5,267,082 | 11/1993 | Ono et al. | 359/687 |
| 5,530,592 | 6/1996 | Tochigi | 359/687 |
| 5,537,255 | 7/1996 | Tochigi | 359/684 |
| 5,612,825 | 3/1997 | Horiuchi et al. | 359/687 |
| 5,739,961 | 4/1998 | Nakayama et al. | 359/687 |
| 5,751,497 | 5/1998 | Usui et al. | 359/687 |
| 5,847,882 | 12/1998 | Nakayama | 359/684 |

FOREIGN PATENT DOCUMENTS

| | | |
|---|---|---|
| 62-24213 | 2/1987 | Japan . |
| 62-247316 | 10/1987 | Japan . |
| 2-39011 | 2/1990 | Japan . |
| 3-180809 | 8/1991 | Japan . |
| 6-324265 | 11/1994 | Japan . |

*Primary Examiner*—Georgia Epps
*Assistant Examiner*—Jordan M. Schwartz
*Attorney, Agent, or Firm*—Fitzpatrick, Cella, Harper & Scinto

[57] ABSTRACT

A zoom lens comprises, in order from an object side to an image side, a first lens unit of positive refractive power and a second lens unit of negative refractive power, and at least one lens unit located on the image side of the second lens unit, wherein the first lens unit comprises one negative lens and at least two positive lenses, and wherein an air separation between the negative lens and the positive lens adjacent thereto is the widest in the first lens unit.

6 Claims, 8 Drawing Sheets

FNO/1.85
g-LINE, d-LINE

-0.03   0.03
SPHERICAL ABERRATION

2ω=73.2°
ΔM, ΔS

-0.03   0.03
ASTIGMATISM

2ω=73.2°

-5.00   5.00
DISTORTION (%)

FNO/2.17
d-LINE, g-LINE

-0.03   0.03
SPHERICAL ABERRATION

2ω=7.0°
ΔM, ΔS

-0.03   0.03
ASTIGMATISM

2ω=7.0°

-5.00   5.00
DISTORTION (%)

Fno/1.85

-0.03    0.03
SPHERICAL ABERRATION

2ω=73.2°

-0.03    0.03
ASTIGMATISM

2ω=73.2°

-5.00    5.00
DISTORTION (%)

Fno/2.13

-0.03    0.03
SPHERICAL ABERRATION

2ω=7.0°

-0.03    0.03
ASTIGMATISM

2ω=7.0°

-5.00    5.00
DISTORTION (%)

ZOOM LENS

BACKGROUND OF THE INVENTION

1. Field of the Invention

This invention relates to zoom lenses and, more particularly, to large relative aperture, high range zoom lenses for use in photographic cameras, video cameras or broadcasting cameras. Still more particularly, it relates to zoom lenses whose zoom ratio is 12 and F-number is about 1.8 to 2.2 and which nonetheless are of the wide-angle type with a field angle of 70 degrees or wider at the wide-angle end.

2. Description of Related Art

In photographic cameras or video cameras, many zoom lenses of the so-called "rear focus" type have been proposed in which a lens unit other than the front or first lens unit is made movable for focusing.

In general, as compared with the other type in which the first lens unit is moved to effect focusing, the rear focus type of zoom lens has such advantages that the effective diameter of the first lens unit becomes smaller, thereby minimizing the bulk and size of the entirety of the lens system, that close-up photography, particularly, supershort focusing, is carried out with ease, and further that, since the lens unit for focusing is smaller in size and lighter in weight, because a weaker driving torque suffices for moving it, rapid focus adjustment can be carried out.

In Japanese Laid-Open Patent Applications Nos. Sho 62-247316 and Sho 62-24213, a zoom lens is disclosed comprising, in order from an object side, a first lens unit of positive refractive power, a second lens unit of negative refractive power, a third lens unit of positive refractive power and a fourth lens unit of positive refractive power, totalling four lens units, wherein the second lens unit is made axially movable for varying the focal length and the compensation for the image shift with zooming and the focusing are carried out by moving the fourth lens unit.

Japanese Laid-Open Patent Applications No. Hei 2-39011 discloses a zoom lens comprising, in order from an object side, a first lens unit of positive refractive power, a second lens unit of negative refractive power axially movable for varying the focal length, a third lens unit of positive refractive power for condensing light and a fourth lens unit of positive refractive power axially movable for keeping the image plane at a constant position from a reference plane, which would otherwise shift when the second lens unit moves or when the object distance varies. The first lens unit is constructed with a single lens of negative refractive power and a single lens of positive refractive power. The zoom lens employs an aspheric surface.

Japanese Laid-Open Patent Application No. Hei 3-180809 discloses a zoom lens comprising, in order from an object side, a first lens unit of positive refractive power, a second lens unit of negative refractive power, a third lens unit of positive refractive power and a fourth lens unit of positive refractive power, totaling four lens units. During zooming, the second lens unit moves, while at least one of the other lens units moves to compensate for the image shift. The first lens unit is constructed with a negative lens of meniscus form convex toward the object side and, behind an appreciable space, a positive lens having a strong refracting surface facing the object side, totaling two lenses.

Japanese Laid-Open Patent Application No. Hei 6-324265 discloses a zoom lens comprising, in order from an object side, a first lens unit of positive refractive power, a second lens unit of negative refractive power, a third lens unit of positive refractive power and a fourth lens unit of positive refractive power, the second and fourth lens units being axially moved so that the air separation between any adjacent two of the lens units varies to continuously vary the focal length. The first lens unit is constructed with four lenses, i.e., a positive lens, a negative lens, a positive lens and a positive lens in this order from the object side, thus contributing to an increase of the angle of field.

In general, the use of the rear focus type in the zoom lens leads to minimize the bulk and size of the lens system as a whole. Also, rapid focusing becomes possible. On the other hand, however, during focusing, the aberrations vary to a greater extent, giving rise to a very difficult problem of simultaneously fulfilling the requirements of achieving improvements of the compact form and of maintaining a good stability of high optical performance throughout the entire focusing range. Particularly, in the large relative aperture, high range zoom lens, the problem of obtaining a high optical performance throughout the entire zooming range as well as the entire focusing range becomes more serious.

To achieve simultaneous increases of the angular field and the zooming range, the front or first lens unit has to increase in the effective diameter. So, another problem arises in that the lens system as a whole becomes longer and bulkier.

For example, in the above-mentioned Japanese Laid-Open Patent Application No. Hei 2-39011, the proposed zoom lens has its angle of field being not sufficient. Another proposed zoom lens in the above-mentioned Japanese Laid-Open Patent Application No. Hei 3-180809 makes use of an air lens in the first lens unit for the purpose of correcting aberrations, but its angle of field is not necessarily wide enough. Also, the wide-angle zoom lens proposed in the above-mentioned Japanese Laid-Open Patent Application No. Hei 6-324265 has its first lens unit constructed, in an actual practice of its embodiment, from a negative lens, a positive lens, a positive lens and a positive lens. However, because of the narrow air separation between the negative lens and the positive lens, the rear principal point of the first lens unit is not brought sufficiently close to the second lens unit. Therefore, the diameter of the front lens members becomes greater than might be expected from the angle of field.

BRIEF SUMMARY OF THE INVENTION

The present invention aims to increase the relative aperture and the zoom ratio at once with the limitation of the bulk and size of the entire lens system to a minimum. An object of the invention is, therefore, to provide such a zoom lens with its angle of field greatly increased, while still permitting good optical performance to be maintained stable throughout the entire zooming range and throughout the entire focusing range.

The invention employs the rear focusing method. By this, the aperture ratio and the zoom ratio are increased and, at the same time, the compact form is improved. Another object of the invention is, therefore, to provide a wide-angle zoom lens of the rear focus type having a good stability of optical performance throughout the entire zooming range and throughout the entire focusing range.

To attain the above-stated objects, in accordance with an embodiment of the invention, there is provided a zoom lens comprising, in order from an object side to an image side, a first lens unit of positive refractive power, a second lens unit of negative refractive power and at least one lens unit located on the image side of the second lens unit, wherein the first lens unit comprises one negative lens and at least two positive lenses, and wherein an air separation between the negative lens and the positive lens adjacent thereto is the widest in the first lens unit.

Specifically, the zoom lens is characterized by satisfying the following condition:

$$0.15 < Da/DL1 < 0.5 \tag{1}$$

where DL1 is the length of the first lens unit along an optical axis, and Da is the air separation between the negative lens and the positive lens adjacent thereto.

In the lens block diagrams, L1 denotes the first lens unit, L2 denotes the second lens unit, L3 denotes the third lens unit and L4 denotes the fourth lens unit. SP stands for the stop and IP stands for the image plane. In the aberration curves, d stands for the spectral d-line, g stands for the spectral g-line, ΔS stands for the sagittal image surface, and ΔM stands for the meridional image surface.

DETAILED DESCRIPTION OF THE INVENTION

Figure 1:
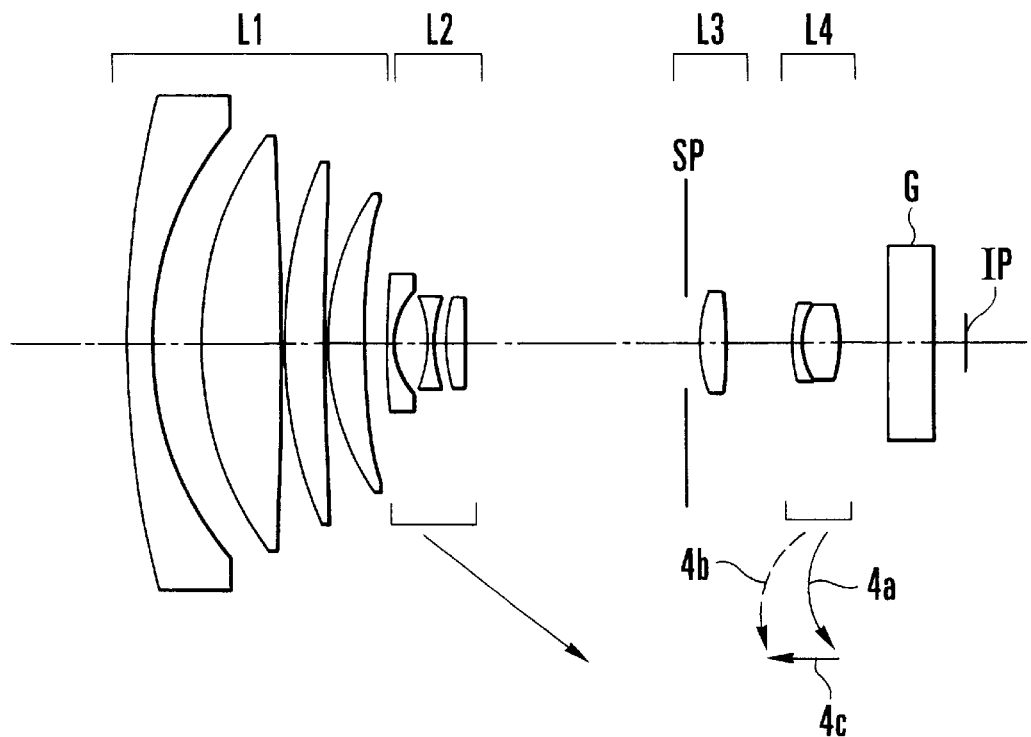
FIG. 1 is a lens block diagram of a numerical example 1 of the invention in the wide-angle end.
Figure 2:
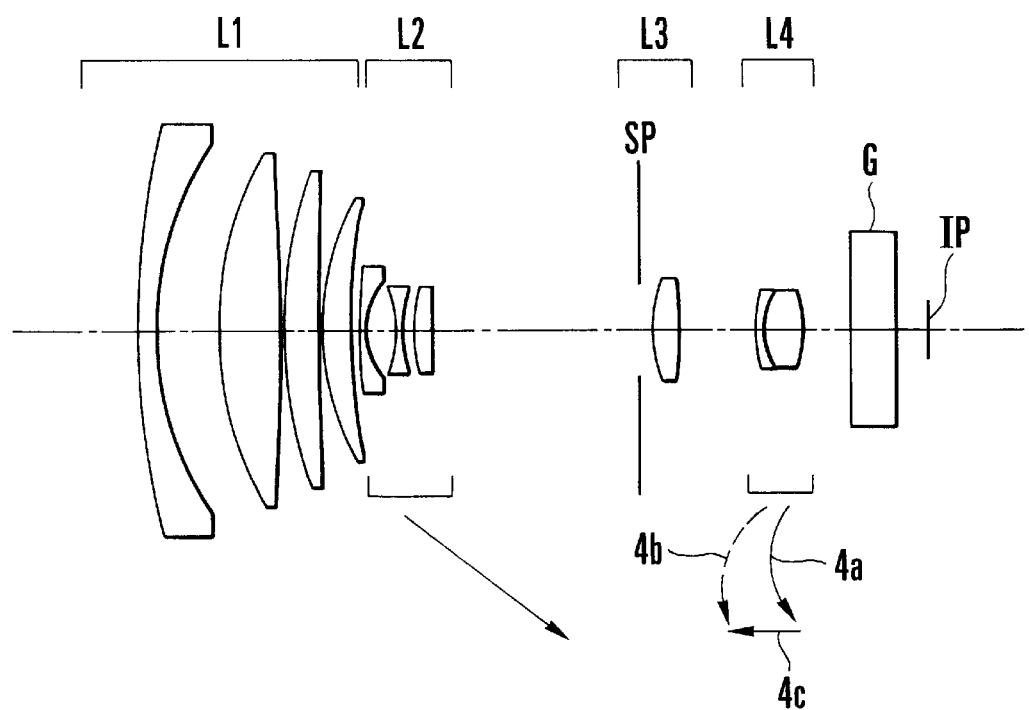
FIG. 2 is a lens block diagram of a numerical example 2 of the invention in the wide-angle end.
Figure 3:
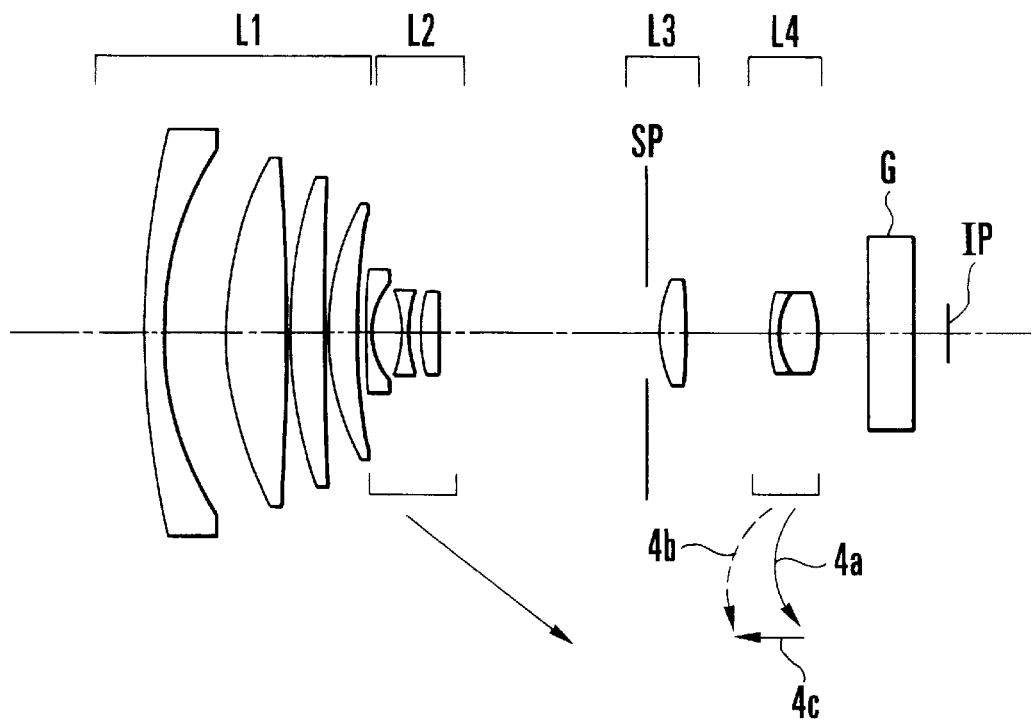
FIG. 3 is a lens block diagram of a numerical example 3 of the invention in the wide-angle end.
Figure 4:
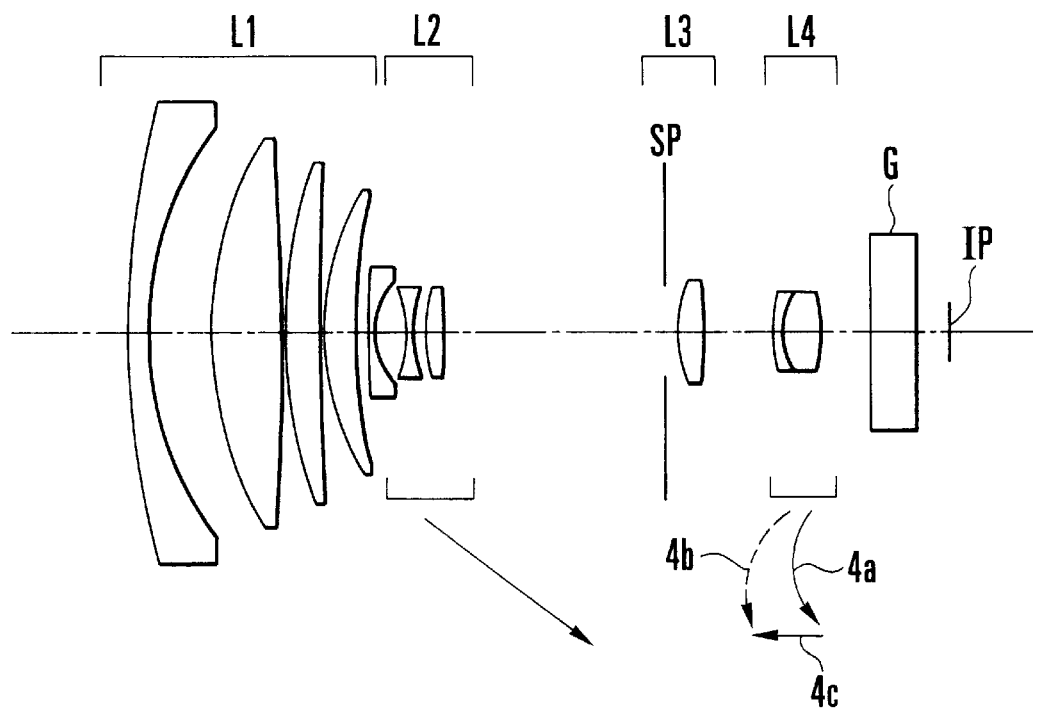
FIG. 4 is a lens block diagram of a numerical example 4 of the invention in the wide-angle end.
Figure 5:
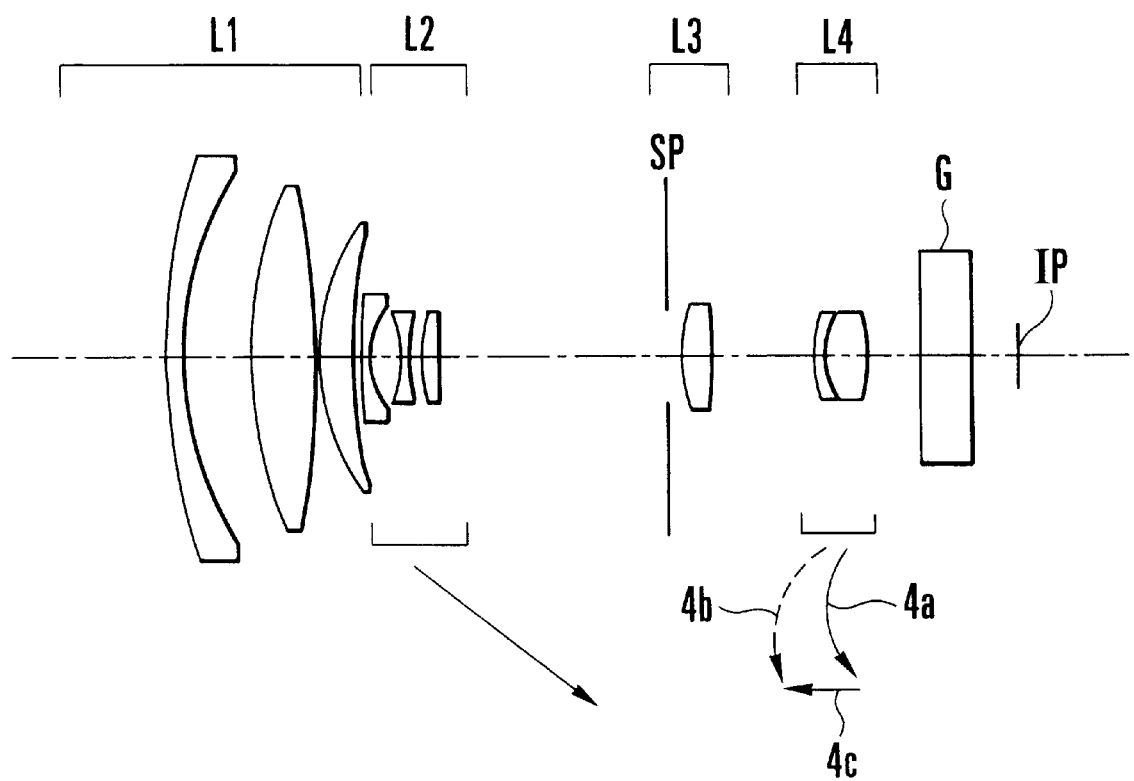
FIG. 5 is a lens block diagram of a numerical example 5 of the invention in the wide-angle end.
Figure 6A:
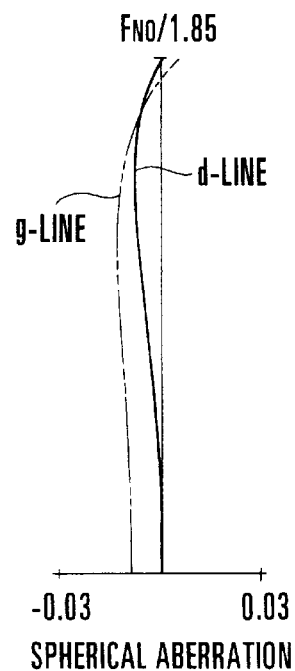
FIGS. 6A, 6B and 6C are graphic representations of the aberrations of the numerical example 1 of the invention in the wide-angle end.
Figure 6B:
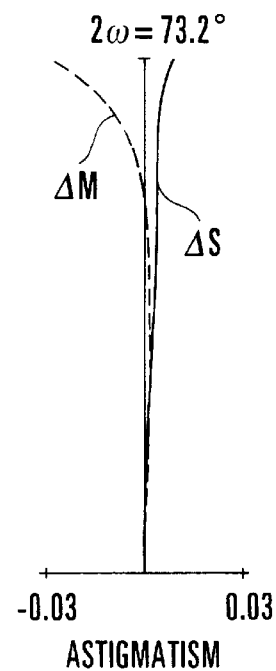
Figure 6C:
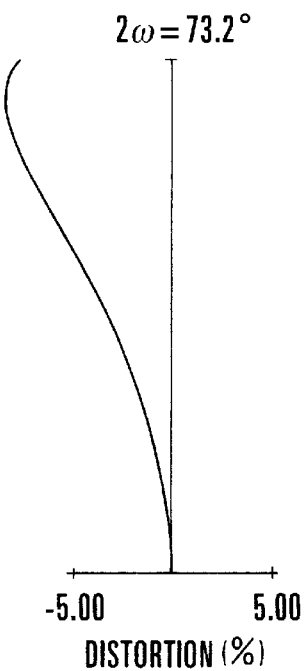
Figure 7A:
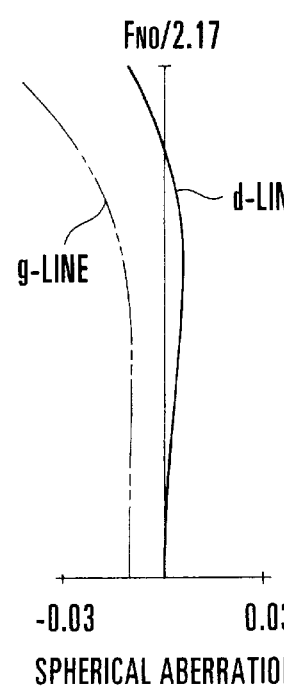
FIGS. 7A, 7B and 7C are graphic representations of the aberrations of the numerical example 1 of the invention in the telephoto end.
Figure 7B:
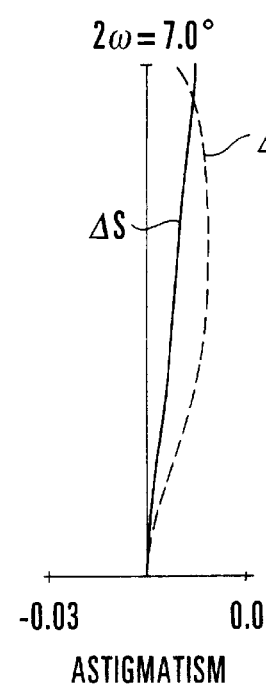
Figure 7C:
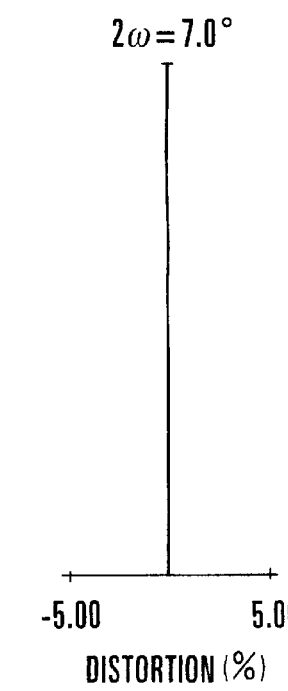
Figure 8A:
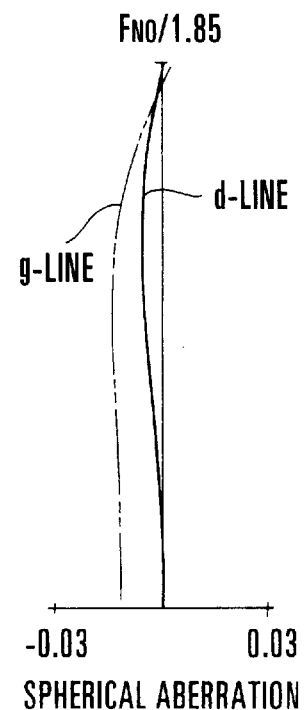
FIGS. 8A, 8B and 8C are graphic representations of the aberrations of the numerical example 2 of the invention in the wide-angle end.
Figure 8B:
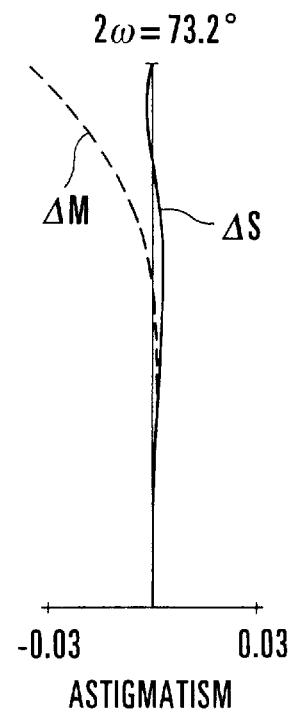
Figure 8C:
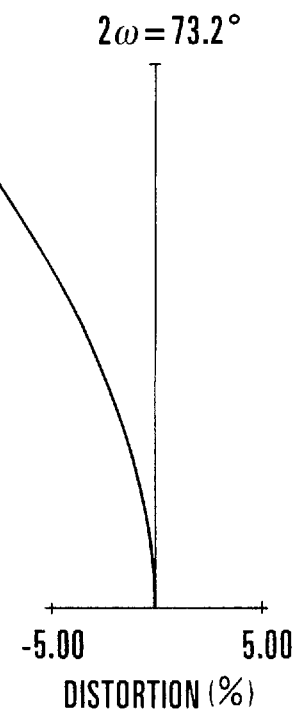
Figure 9A:
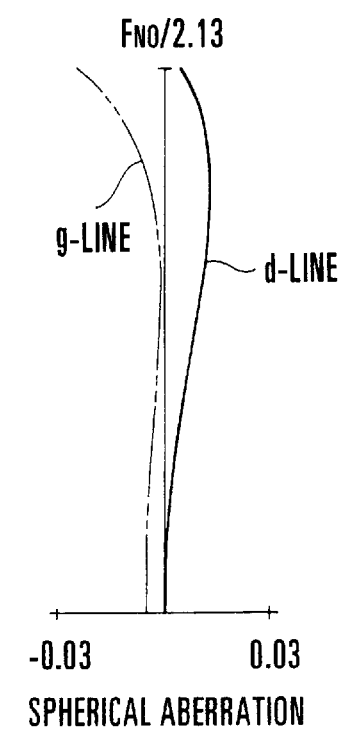
FIGS. 9A, 9B and 9C are graphic representations of the aberrations of the numerical example 2 of the invention in the telephoto end.
Figure 9B:
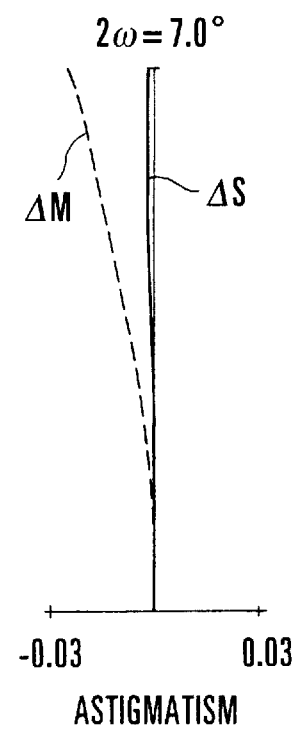
Figure 9C:
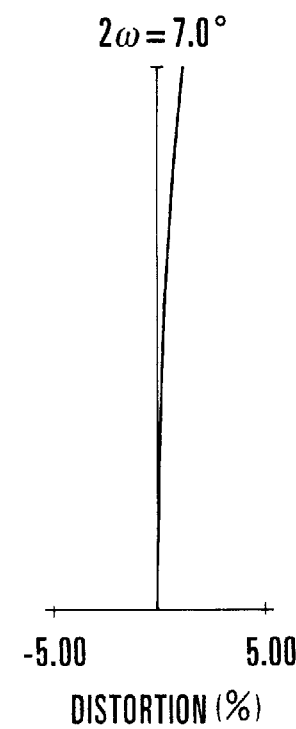
Figures 10A, 10B, 10C:
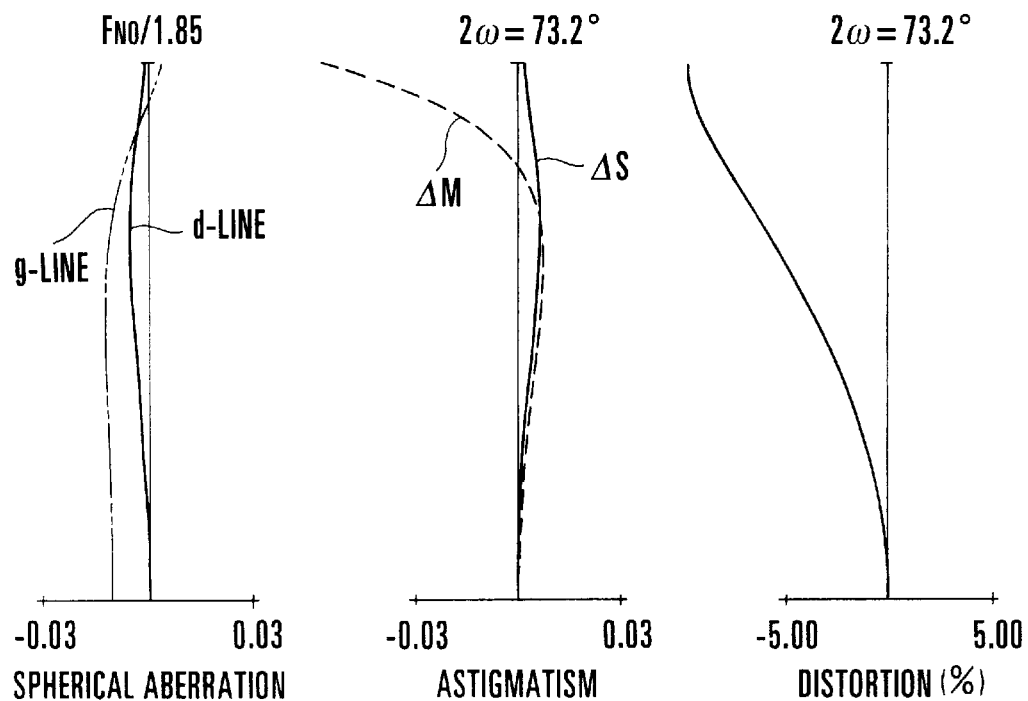
FIGS. 10A, 10B and 10C are graphic representations of the aberrations of the numerical example 3 of the invention in the wide-angle end.
Figures 11A, 11B, 11C:
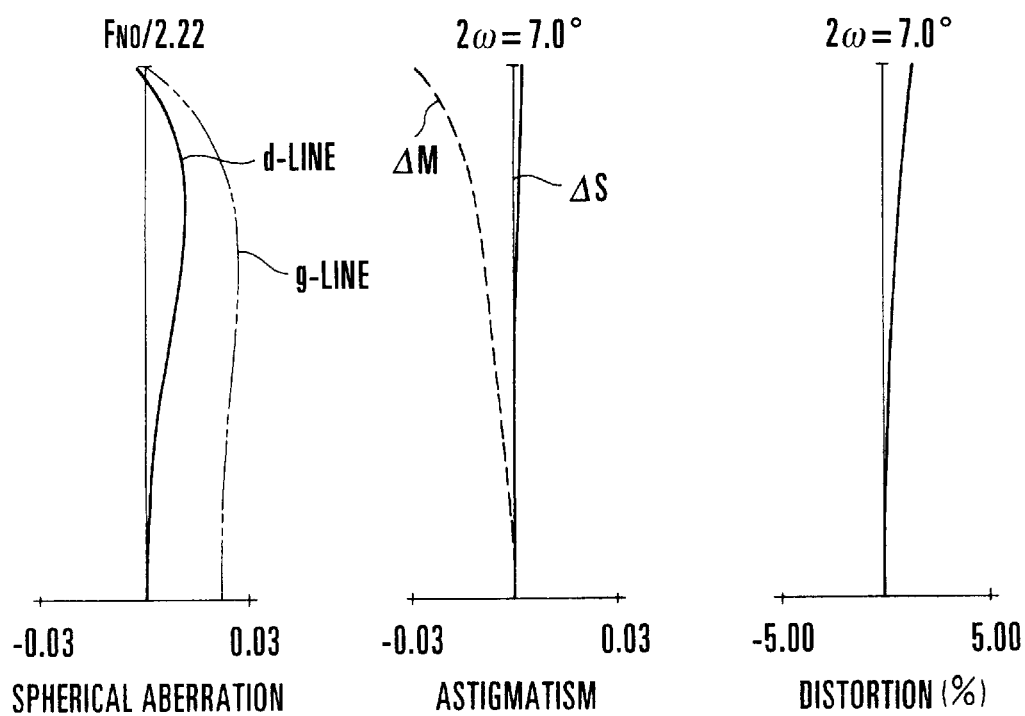
FIGS. 11A, 11B and 11C are graphic representations of the aberrations of the numerical example 3 of the invention in the telephoto end.
Figures 12A, 12B, 12C:
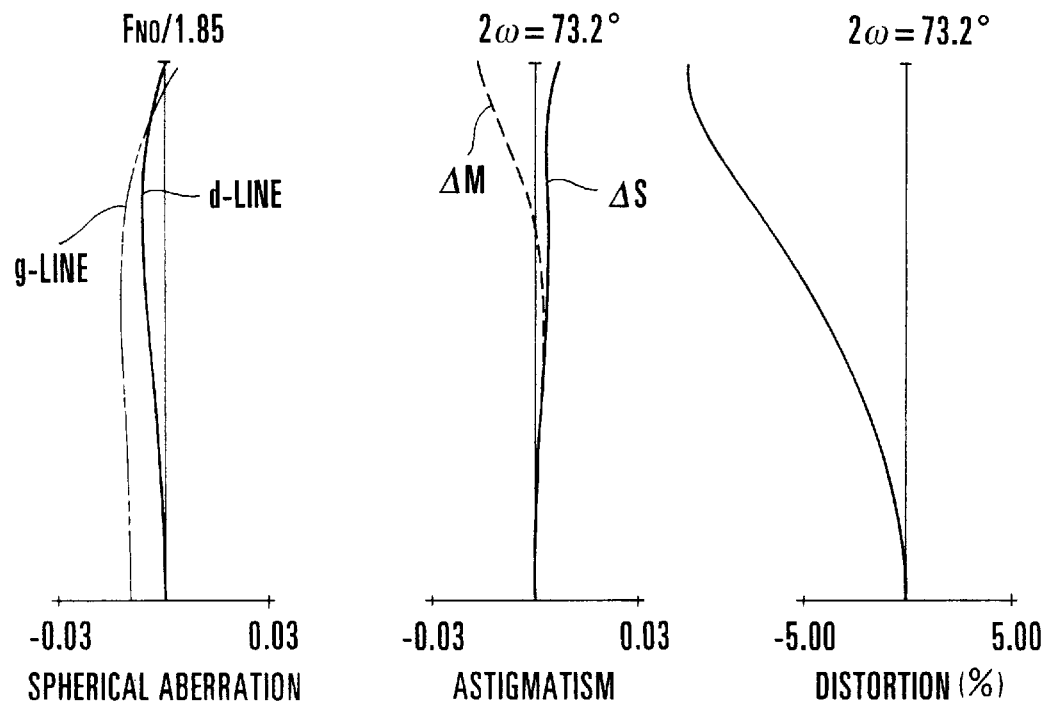
FIGS. 12A, 12B and 12C are graphic representations of the aberrations of the numerical example 4 of the invention in the wide-angle end.
Figures 13A, 13B, 13C:
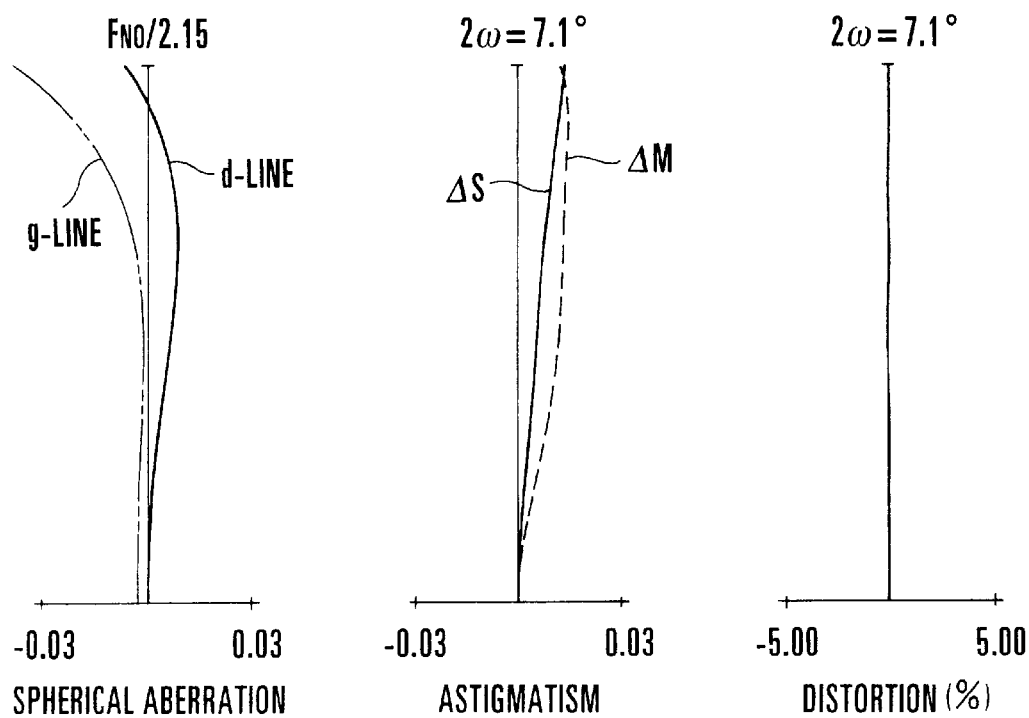
FIGS. 13A, 13B and 13C are graphic representations of the aberrations of the numerical example 4 of the invention in the telephoto end.
Figures 14A, 14B, 14C:
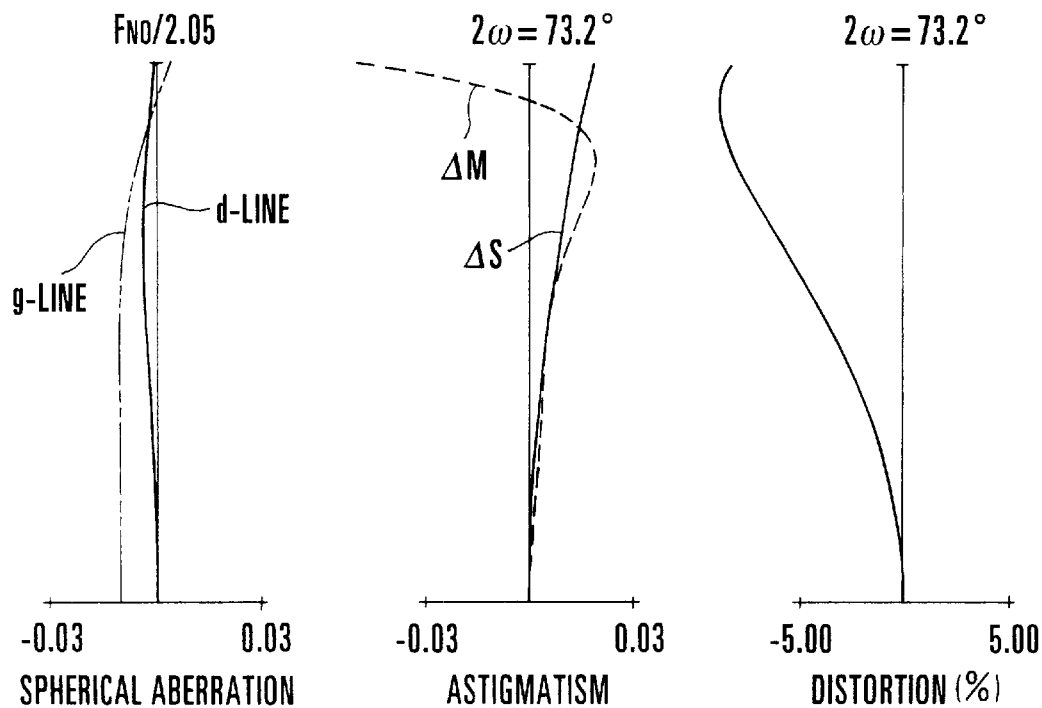
FIGS. 14A, 14B and 14C are graphic representations of the aberrations of the numerical example 5 of the invention in the wide-angle end.
Figures 15A, 15B, 15C:
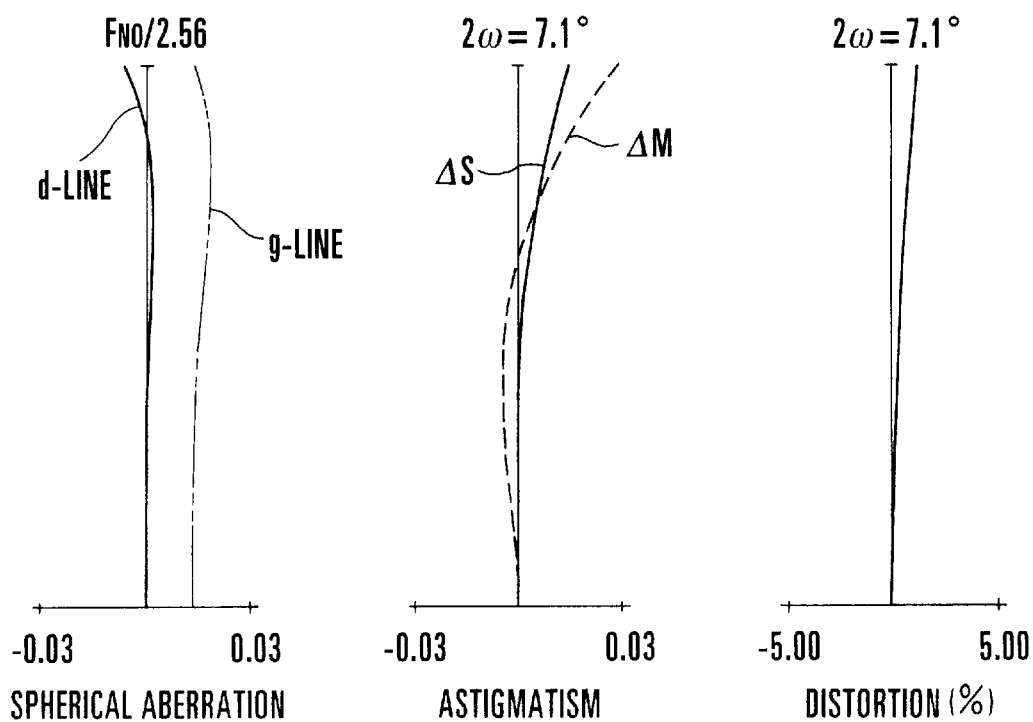
FIGS. 15A, 15B and 15C are graphic representations of the aberrations of the numerical example 5 of the invention in the telephoto end.

FIGS. 1 to 5 are longitudinal section views of numerical examples 1 to 5 of zoom lenses of the invention in the wide-angle end, respectively.

Referring to FIGS. 1 to 5, L1 denote a first lens unit of positive refractive power, L2 denotes a second lens unit of negative refractive power, L3 denotes a third lens unit of positive or negative refractive power, and L4 denotes a fourth lens unit of positive refractive power. A stop SP is positioned in front of the third lens unit L3. A glass block G such as optical filter is in between the fourth lens unit L4 and an image plane IP.

During zooming from the wide-angle end to the telephoto end, the second lens unit L2 axially moves toward the image side as shown by the arrow. To compensate for the shift of the image plane IP with zooming, the fourth lens unit L4 axially moves while depicting a locus convex toward the object side.

For the focusing purposes, the fourth lens unit L4 is also made to move axially, as the rear focus type is employed. The curved lines 4a and 4b in FIGS. 1 to 5 show the loci of motion of the fourth lens unit L4 during zooming from the wide-angle end to the telephoto end when the zoom lens is focused on an object at infinity and an object at the minimum distance, respectively. The first lens unit L1 and the third lens unit L3 remain stationary during zooming and during focusing.

In such a zoom lens configuration, with the setting in, for example, the telephoto end, during focusing from an infinitely distant object to closer objects, the fourth lens unit L4 moves forward as shown by a straight line 4c in FIGS. 1 to 5. In the embodiment of the invention, by adopting the focusing arrangement described above as derived by employing the rear focusing method, an advantage is produced that the effective diameter of the first lens unit is prevented from increasing, as compared with the conventional 4-unit zoom lens which performs focusing by moving the first lens unit.

In addition, the construction and arrangement of the constituent lenses of the first lens unit are specified as stated above. This feature assures improvement of the compact form of the lens system as a whole, while still maintaining a good optical performance to be achieved throughout the entire zooming range and throughout the entire focusing range, so that a high range wide-angle zoom lens is realized.

The technical significance of the condition (1) described above is explained below.

The inequalities of condition (1) are concerned with the configuration of the first lens unit by the inverted telephoto ratio, in other words, the position of its rear principal point. When the lower limit of the condition (1) is exceeded, as this means that the separation between the negative lens and the positive lens adjacent thereto is too narrow, the rear principal point becomes too much close to the first lens unit. In regard to the second lens unit, the principal point interval must be increased. As a result, the entrance pupil takes a deep position, causing the effective diameter of each lens in the first lens unit to increase greatly. Conversely, when the separation between the negative lens and the positive lens adjacent thereto is too large beyond the upper limit, the total length of the entire lens system must be increased in order to secure sufficient off-axial light bundle. The effective diameter of the negative lens is also caused to increase objectionably. As can be seen from the above, the condition (1) is satisfactory to make a good compromise between the shortening of the total length of the entire lens system and the reduction of the diameter of the front lens members. For more improved results, it is preferable that the condition (1) be set forth as follows:

$$0.18 < Da/DL1 < 0.45 \tag{1a}$$

The above-described features or conditions suffice for accomplishing the objects of the invention. However, to facilitate simultaneous fulfillment of the requirements of improving the compact form of the entire lens system and of securing a high optical performance throughout the entire zooming range, it is preferable to satisfy at least one of the following four features (i) to (iv).

(i) Letting an image magnification at the telephoto end of the second lens unit be denoted by β2T, a zoom ratio by Z, a focal length of the i-th lens unit by fi and a focal length of the whole zoom lens by FW, the following conditions are satisfied:

$$-0.9 < \beta 2T/\sqrt{Z} < -0.3 \tag{2}$$

$$-1.8 < f2/FW < -1 \tag{3}$$

$$0.4 < f3/f4 < 1.2 \tag{4}$$

The inequalities of condition (2) are concerned with the image magnification at the telephoto end of the second lens unit in terms of the zoom ratio. When the lower limit of the condition (2) is exceeded, as this means that the image magnification is too small, the required amount of movement for the predetermined zoom ratio of the second lens unit becomes longer, causing the total length of the entire lens system and the diameter of the front lens members both to increase greatly. Conversely, when the image magnification is too large beyond the upper limit, the image magnification (β2W at the wide-angle end of the second lens unit becomes high in order to obtain a predetermined zoom ratio. In turn, the first and second lens units in the wide-angle end have their overall focal length "f1·β2W" increased. For this reason, the entrance pupil, which is defined by the lens units located before the stop, takes a deep position, thereby inviting an increase of the diameter of the front lens members. The satisfaction of the condition (2) thus assures shortening of the total length of the entire lens system and reduction of the diameter of the front lens members at once.

The inequalities of condition (3) are concerned with the focal length of the second lens unit. When the lower limit of the condition (3) is exceeded, as this means that the focal length of the second lens unit is too short, the Petzval sum increases in the under direction, thereby making aberrations such as the inclination of the image plane difficult to correct. Conversely, when the focal length of the second lens unit is too long beyond the upper limit, the second lens unit has to move longer with zooming, causing increase of the diameter of the front lens members.

The inequalities of condition (4) are concerned with the ratio of the focal lengths of the third and fourth lens units and have an aim to improve the compact form of that part of the lens system which follows the stop, while keeping the sufficient back focal length. This aim is attained along with another aim of maintaining a good optical performance throughout. When the lower limit of the condition (4) is exceeded, as this implies that the focal length of the third lens unit is too short, it becomes difficult to correct variation of spherical aberration with zooming or focusing. Also, in some cases, the back focal length is hardly secured. In other cases, the exit pupil becomes short in the middle region of the zooming range. In other cases, the movement of the fourth lens unit is caused to increase. So, variation of aberrations with zooming or focusing comes to increase. Conversely, when the upper limit is exceeded, as this implies that the focal length of the third lens unit is too long, the light beam emerging from the third lens unit diverges greatly. Therefore, the effective diameter of the fourth lens unit has to increase. Also, because the fourth lens becomes heavy, smooth focusing cannot be performed with ease.

As can be seen from the above description, the conditions (2), (3) and (4) are satisfactory to the aim of simultaneously fulfilling the requirements of, despite the angle of field being wide, reducing the diameter of the front lens members with the total length of the entire lens system shortened and of obtaining a good optical performance. For more improved results, it is preferable that the ranges for the factors of all the conditions be set forth as follows:

$$-0.8 < \beta 2T/\sqrt{Z} < -0.4 \tag{2a}$$

$$-1.7 < f2/FW < -1.2 \tag{3a}$$

$$0.5 < f3/f4 < 1.1 \tag{4a}$$

(ii) Letting the focal length at the telephoto end of the whole zoom lens be denoted by FT, the separation between the third and fourth lens units when focusing on an infinitely distant object at the telephoto end by D34T, and the overall focal length at the telephoto end of the first to third lens units by f123T, the following conditions are satisfied:

$$-0.1 < FT/f123T < 0.6 \tag{5}$$

$$-7 < f1/f2 < -4 \tag{6}$$

$$0.2 < D34T/\sqrt{FW \cdot FT} < 0.5 \tag{7}$$

The inequalities of condition (5) are concerned with the degree of collimation (afocal degree) of the on-axial light rays emerging from the third lens unit. When the upper limit of the condition (5) is exceeded, as this means that the on-axial rays converge too strongly, the astigmatic difference increases greatly, as the object distance approaches the minimum, and the meridional image focus comes to be under-corrected. Conversely, when the lower limit is exceeded, as this means that the on-axial rays diverge too strongly, the height of incidence on the fourth lens unit becomes high, causing spherical aberration to increase objectionably.

The inequalities of condition (6) are concerned with the ratio of the focal lengths of the first and second lens units and have an aim to achieve improvements of the compact form of the entire lens system, while still maintaining a good optical performance. When the lower limit of the condition (6) is exceeded, as this implies that the focal length of the second lens unit is too long, or that the focal length of the first lens unit is too short, the movement of the second lens unit increases. So, it becomes difficult to shorten the total length of the entire lens system and reduce the diameter of the front lens members. Also, the fourth lens has to move at a faster speed when zooming nears the telephoto end. This causes an increase of the variation of aberrations with zooming. Conversely, when the upper limit is exceeded, it becomes difficult to correct distortion and other aberrations well.

The inequalities of condition (7) are concerned with the separation between the third and fourth lens units when focusing on an infinitely distant object at the telephoto end. When the upper limit of the condition (7) is exceeded, as this means that the separation between the third and fourth lens units is too wide, the off-axial light beam is incident high on the fourth lens unit. Therefore, it becomes difficult to correct aberrations. The effective diameter of the fourth lens unit is also caused to increase. Conversely, when the separation is too narrow beyond the lower limit, it becomes difficult to secure the required space for the extended focusing movement of the fourth lens unit to the minimum object distance.

It will be appreciated from the above description that the conditions (5), (6) and (7) are satisfactory to the aim of making a good compromise between the improved compact form and a good stability of optical performance. For more improved results, it is preferable that the numerical ranges be set forth as follows:

$$0 < FT/f123T < 0.5 \quad (5a)$$

$$-6.5 < f1/f2 < -4.8 \quad (6a)$$

$$0.25 < D34T/\sqrt{FW \cdot FT} < 0.45. \quad (7a)$$

(iii) To further improve the optical performance and to further widen the angle of field with the total length of the entire lens system shortened and with the diameter of the front lens members reduced, it is preferable that the numerical ranges for the factors of the above-described conditions (1) to (7) be set forth as follows:

$$0.2 < Da/DL1 < 0.4 \quad (1b)$$

$$-0.75 < \beta 2T/\sqrt{Z} < -0.5 \quad (2b)$$

$$-1.6 < f2/FW < -1.3 \quad (3b)$$

$$0.6 < f3/f4 < 1 \quad (4b)$$

$$0 < FT/f123T < 0.45 \quad (5b)$$

$$-6 < f1/f2 < -5.2 \quad (6b)$$

$$0.28 < D34T/\sqrt{FW \cdot FT} < 0.4. \quad (7b)$$

(iv) At least one aspheric surface is used in the first lens unit. This makes it easier to correct distortion well.

Next, the numerical examples 1 to 5 of the invention are shown. In the data for the numerical examples 1 to 5, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side. Also, it is to be noted that, in the numerical examples 1 to 5, the last two surfaces define a face plate, filter or like glass block.

The values of the factors in the above-described conditions (1) to (7) for the numerical examples 1 to 5 are listed in Table-1.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1+\sqrt{1-(1+K)(H/R)^2}} + BH^4 + CH^6 + DH^8 + EH^{10} + FH^{12}$$

where R is the radius of the osculating sphere, and K, B, C, D, E and F are the aspheric coefficients.

In the values of the aspheric coefficients, the notation "e-0X" means $10^{-x}$ (Numerical Example 1)
f = 1.00–12.09  FNO = 1.85–2.17  2ω = 73.2°–7.0°

| | | | |
|---|---|---|---|
| R 1 = 24.714 | D 1 = 0.64 | N 1 = 1.846660 | v 1 = 23.8 |
| R 2 = 8.471 | D 2 = 1.20 | | |
| R 3 = 9.116 | D 3 = 2.00 | N 2 = 1.516330 | v 2 = 64.2 |
| R 4 = −98.727 | D 4 = 0.06 | | |
| R 5 = 11.897 | D 5 = 1.03 | N 3 = 1.603112 | v 3 = 60.7 |
| R 6 = 110.967 | D 6 = 0.06 | | |
| R 7 = 6.887 | D 7 = 0.91 | N 4 = 1.772499 | v 4 = 49.6 |
| R 8 = 16.247 | D 8 = Variable | | |
| R 9 = 21.688 | D 9 = 0.18 | N 5 = 1.882997 | v 5 = 40.8 |
| R10 = 1.847 | D10 = 0.85 | | |
| R11 = −2.830 | D11 = 0.18 | N 6 = 1.696797 | v 6 = 55.5 |
| R12 = 3.062 | D12 = 0.27 | | |
| R13 = 3.822 | D13 = 0.48 | N 7 = 1.846660 | v 7 = 23.8 |
| R14 = −30.395 | D14 = Variable | | |
| R15 = Stop | D15 = 0.33 | | |
| R16 = 3.223 | D16 = 0.67 | N 8 = 1.583126 | v 8 = 59.4 |
| R17 = −11.919 | D17 = Variable | | |
| R18 = 3.737 | D18 = 0.21 | N 9 = 1.846660 | v 9 = 23.8 |
| R19 = 1.583 | D19 = 0.04 | | |
| R20 = 1.722 | D20 = 0.94 | N10 = 1.583126 | v10 = 59.4 |
| R21 = −4.363 | D21 = 1.21 | | |
| R22 = ∞ | D22 = 1.17 | N11 = 1.516330 | v11 = 64.2 |
| R23 = ∞ | | | |

| Variable | Focal Length | | |
|---|---|---|---|
| Separation | 1.00 | 5.42 | 12.09 |
| D 8 | 0.34 | 4.36 | 5.49 |
| D14 | 5.47 | 1.45 | 0.31 |
| D17 | 1.64 | 0.39 | 1.07 |

Aspheric Coefficients:

| | | | |
|---|---|---|---|
| R16: | K = −1.886e+00 | B = −1.887e−04 | C = −1.544e−04 |
| | D = −1.929e−04 | E = 3.988e−05 | |
| R21: | K = −4.760e+00 | B = −1.017e−02 | C = −2.201e−03 |
| | D = −2.286e−03 | E = 4.801e−04 | |

(Numerical Example 2)
f = 1.00–12.05  FNO = 1.85–2.13  2ω = 73.2°–7.0°

| | | | |
|---|---|---|---|
| R 1 = 21.017 | D 1 = 0.48 | N 1 = 1.846660 | v 1 = 23.8 |
| R 2 = 8.436 | D 2 = 1.53 | | |
| R 3 = 9.106 | D 3 = 1.55 | N 2 = 1.496999 | v 2 = 81.6 |
| R 4 = −70.657 | D 4 = 0.06 | | |
| R 5 = 11.824 | D 5 = 0.89 | N 3 = 1.603112 | v 3 = 60.7 |
| R 6 = 122.697 | D 6 = 0.06 | | |
| R 7 = 6.665 | D 7 = 0.74 | N 4 = 1.772499 | v 4 = 49.6 |
| R 8 = 16.411 | D 8 = Variable | | |
| R 9 = 18.312 | D 9 = 0.18 | N 5 = 1.882997 | v 5 = 40.8 |
| R10 = 1.883 | D10 = 0.76 | | |
| R11 = −2.716 | D11 = 0.18 | N 6 = 1.696797 | v 6 = 55.5 |
| R12 = 3.207 | D12 = 0.27 | | |
| R13 = 4.059 | D13 = 0.45 | N 7 = 1.846660 | v 7 = 23.8 |
| R14 = −296.135 | D14 = Variable | | |
| R15 = Stop | D15 = 0.33 | | |
| R16 = 3.221 | D16 = 0.67 | N 8 = 1.583126 | v 8 = 59.4 |
| R17 = −12.420 | D17 = Variable | | |
| R18 = 3.574 | D18 = 0.21 | N 9 = 1.846660 | v 9 = 23.8 |
| R19 = 1.589 | D19 = 0.04 | | |

-continued

| | | | |
|---|---|---|---|
| R20 = 1.730 | D20 = 0.94 | N10 = 1.583126 | v10 = 59.4 |
| R21 = −4.439 | D21 = 1.21 | | |
| R22 = ∞ | D22 = 1.17 | N11 = 1.516330 | V11 = 64.2 |
| R23 = ∞ | | | |

| Variable | Focal Length | | |
|---|---|---|---|
| Separation | 1.00 | 5.46 | 12.05 |
| D 8 | 0.20 | 3.97 | 5.03 |
| D14 | 5.14 | 1.38 | 0.31 |
| D17 | 1.86 | 0.52 | 1.25 |

Aspheric Coefficients:

| R16: | K = −1.955e+00 | B = −3.125e−06 | C = −1.433e−04 |
|---|---|---|---|
| | D = −2.042e−04 | B = 5.773e−05 | |
| R21: | K = −4.659e+00 | B = −9.695e−03 | C = −1.380e−03 |
| | D = −2.223e−03 | E = −5.090e−04 | |

(Numerical Example 3)
f = 1.00–12.17 FNO = 1.85–2.22 2ω = 73.2°–7.0°

| | | | |
|---|---|---|---|
| R 1 = 22.344 | D 1 = 0.48 | N 1 = 1.846660 | v 1 = 23.8 |
| R 2 = 8.606 | D 2 = 1.53 | | |
| R 3 = 9.181 | D 3 = 1.55 | N 2 = 1.496999 | v 2 = 81.6 |
| R 4 = −62.757 | D 4 = 0.06 | | |
| R 5 = 11.779 | D 5 = 0.89 | N 3 = 1.603112 | v 3 = 60.7 |
| R 6 = 108.069 | D 6 = 0.06 | | |
| R 7 = 6.610 | D 7 = 0.74 | N 4 = 1.772499 | v 4 = 49.6 |
| R 8 = 16.506 | D 8 = Variable | | |
| R 9 = 18.922 | D 9 = 0.18 | N 5 = 1.882997 | v 5 = 40.8 |
| R10 = 1.878 | D10 = 0.74 | | |
| R11 = −2.705 | D11 = 0.18 | N 6 = 1.696797 | v 6 = 55.5 |
| R12 = 3.241 | D12 = 0.27 | | |
| R13 = 4.032 | D13 = 0.45 | N 7 = 1.846660 | v 7 = 23.8 |
| R14 = 53.762 | D14 = Variable | | |
| R15 = Stop | D15 = 0.33 | | |
| R16 = 3.227 | D16 = 0.67 | N 8 = 1.583126 | v 8 = 59.4 |
| R17 = −12.252 | D17 = Variable | | |
| R18 = 3.711 | D18 = 0.21 | N 9 = 1.846660 | v 9 = 23.8 |
| R19 = 1.590 | D19 = 0.05 | | |
| R20 = 1.731 | D20 = 0.94 | N10 = 1.583126 | v10 = 59.4 |
| R21 = −4.201 | D21 = 1.21 | | |
| R22 = ∞ | D22 = 1.17 | N11 = 1.516330 | v11 = 64.2 |
| R23 = ∞ | | | |

| Variable | Focal Length | | |
|---|---|---|---|
| Separation | 1.00 | 5.49 | 12.17 |
| D 8 | 0.19 | 3.92 | 4.97 |
| D14 | 5.09 | 1.36 | 0.31 |
| D17 | 2.08 | 0.54 | 1.15 |

Aspheric Coefficients:

| R16: | K = −1.958e+00 | B = 2.354e−06 | C = −9.759e−05 |
|---|---|---|---|
| | D = −2.048e−04 | E = 5.770e−05 | |
| R21: | K = −4.736e+00 | B = −9.615e−03 | C = −1.403e−03 |
| | D = −2.223e−03 | E = −5.090e−04 | |

(Numerical Example 4)
f = 1.00–12.00 FNO = 1.85–2.15 2ω = 73.2°–7.1°

| | | | |
|---|---|---|---|
| R 1 = 22.442 | D 1 = 0.52 | N 1 = 1.846660 | v 1 = 23.8 |
| R 2 = 8.468 | D 2 = 1.53 | | |
| R 3 = 9.177 | D 3 = 1.79 | N 2 = 1.496999 | v 2 = 81.6 |
| R 4 = −84.293 | D 4 = 0.06 | | |
| R 5 = 11.858 | D 5 = 0.94 | N 3 = 1.603112 | v 3 = 60.7 |
| R 6 = 103.797 | D 6 = 0.06 | | |
| R 7 = 6.779 | D 7 = 0.82 | N 4 = 1.772499 | v 4 = 49.6 |
| R 8 = 15.808 | D 8 = Variable | | |
| R 9 = 24.112 | D 9 = 0.18 | N 5 = 1.882997 | v 5 = 40.8 |
| R10 = 1.877 | D10 = 0.78 | | |
| R11 = −2.755 | D11 = 0.18 | N 6 = 1.696797 | v 6 = 55.5 |
| R12 = 3.101 | D12 = 0.27 | | |
| R13 = 3.933 | D13 = 0.45 | N 7 = 1.846660 | v 7 = 23.8 |
| R14 = −27.380 | D14 = Variable | | |
| R15 = Stop | D15 = 0.33 | | |
| R16 = 3.248 | D16 = 0.67 | N 8 = 1.583126 | v 8 = 59.4 |
| R17 = −12.289 | D17 = Variable | | |
| R18 = 3.706 | D18 = 0.21 | N 9 = 1.846660 | v 9 = 23.8 |
| R19 = 1.588 | D19 = 0.04 | | |
| R20 = 1.722 | D20 = 0.94 | N10 = 1.583126 | v10 = 59.4 |
| R21 = −4.481 | D21 = 1.21 | | |
| R22 = ∞ | D22 = 1.17 | N11 = 1.516330 | v11 = 64.2 |
| R23 = ∞ | | | |

| Variable | Focal Length | | |
|---|---|---|---|
| Separation | 1.00 | 5.43 | 12.00 |
| D 8 | 0.29 | 4.29 | 5.41 |
| D14 | 5.43 | 1.43 | 0.31 |
| D17 | 1.72 | 0.42 | 1.12 |

Aspheric Coefficients:

| R16: | K = −1.876e+00 | B = −2.094e−04 | C = −1.492e−04 |
|---|---|---|---|
| | D = −1.901e−04 | E = 5.254e−05 | |
| R21: | K = −4.791e+00 | B = −9.757e−03 | C = −1.743e−03 |
| | D = −2.056e−03 | E = −2.324e−05 | |

(Numerical Example 5)
f = 1.00–11.97 FNO = 2.05–2.56 2ω = 73.2°–7.1°

| | | | |
|---|---|---|---|
| R 1 = 14.414 | D 1 = 0.42 | N 1 = 1.922862 | v 1 = 20.9 |
| R 2 = 7.987 | D 2 = 1.53 | | |
| R 3 = 10.014 | D 3 = 1.48 | N 2 = 1.603112 | v 2 = 60.7 |
| R 4 = −20.175 | D 4 = 0.06 | | |
| R 5 = 5.394 | D 5 = 0.76 | N 3 = 1.696797 | v 3 = 55.5 |
| R 6 = 13.464 | D 6 = Variable | | |
| R 7 = 18.014 | D 7 = 0.18 | N 4 = 1.882997 | v 4 = 40.8 |
| R 8 = 1.872 | D 8 = 0.68 | | |
| R 9 = −2.487 | D 9 = 0.18 | N 5 = 1.696797 | v 5 = 55.5 |
| R10 = 3.299 | D10 = 0.27 | | |
| R11 = 3.871 | D11 = 0.39 | N 6 = 1.846660 | v 6 = 23.8 |
| R12 = 55.825 | D12 = Variable | | |
| R13 = Stop | D13 = 0.33 | | |
| R14 = 3.495 | D14 = 0.67 | N 7 = 1.583126 | v 7 = 59.4 |
| R15 = −16.835 | D15 = Variable | | |
| R16 = 3.411 | D16 = 0.21 | N 8 = 1.846660 | v 8 = 23.8 |
| R17 = 1.602 | D17 = 0.05 | | |
| R18 = 1.738 | D18 = 0.94 | N 9 = 1.583126 | v 9 = 59.4 |
| R19 = −4.216 | D19 = 1.21 | | |
| R20 = ∞ | D20 = 1.17 | N10 = 1.516330 | v10 = 64.2 |
| R21 = ∞ | | | |

| Variable | Focal Length | | |
|---|---|---|---|
| Separation | 1.00 | 5.49 | 11.97 |
| D 6 | 0.19 | 3.97 | 5.03 |
| D12 | 5.14 | 1.36 | 0.30 |
| D15 | 2.38 | 0.81 | 1.18 |

Aspheric Coefficients:

| R 1: | K = −5.721e−06 | B = −2.171e−06 | C = −5.045e−07 |
|---|---|---|---|
| | D = 0 | E = 0 | |
| R14: | K = −1.979e+00 | B = −1.431e−04 | C = −8.619e−05 |
| | D = −2.057e−04 | E = 5.746e−05 | |
| R19: | K = −4.936e+00 | B = −8.851e−03 | C = −1.521e−03 |
| | D = −2.223e−03 | E = −5.090e−04 | |

TABLE 1

| Condi-tion No. | Numerical Example | | | | |
|---|---|---|---|---|---|
| | 1 | 2 | 3 | 4 | 5 |
| (1) | 0.204 | 0.287 | 0.287 | 0.267 | 0.359 |
| (2) | −0.727 | −0.730 | −0.641 | −0.728 | −0.548 |

TABLE 1-continued

| Condition No. | Numerical Example | | | | |
|---|---|---|---|---|---|
| | 1 | 2 | 3 | 4 | 5 |
| (3) | −1.515 | −1.424 | −1.364 | −1.515 | −1.364 |
| (4) | 0.745 | 0.783 | 0.784 | 0.754 | 0.983 |
| (5) | 0.403 | 0.359 | 0.302 | 0.390 | 0.120 |
| (6) | −5.460 | −5.297 | −5.486 | −5.278 | −5.614 |
| (7) | 0.307 | 0.361 | 0.330 | 0.324 | 0.342 |

According to the invention, the much-desired increases of the relative aperture and the zoom ratio are achieved with the limitation of the bulk and size of the entire lens system to a minimum. Along with this, the optical performance is maintained stable at a high level throughout the entire zooming range and throughout the entire focusing range despite the zoom lens being of the wide-angle type.

Further, according to the invention, the rear focusing method is employed when the relative aperture and the zoom ratio are increased. It is, therefore, made possible to provide a wide-angle zoom lens of the rear focus type whose compact form is improved, while still permitting a good stability of optical performance to be maintained throughout the entire zooming range and throughout the entire focusing range.

I claim:

1. A zoom lens comprising, in order from an object side to an image side, a first lens unit of positive refractive power, a second lens unit of negative refractive power, a third lens unit of positive refractive power, and at least one lens unit located on the image side of said third lens unit, wherein said first lens unit comprises, in order from the object side to the image side, (i) only one negative lens and (ii) at least two positive lenses, with one of said at least two positive lenses being adjacent to said negative lens, and wherein an air separation between said negative lens and said positive lens adjacent thereto is the widest air separation in said first lens unit, wherein said first lens unit and said third lens unit remain stationary during performing of zooming, and wherein said zoom lens satisfies the following condition:

0.18<Da/DL1<0.5 where DL1 is the length of said first lens unit along an optical axis, and Da is the air separation between said negative lens and said positive lens adjacent thereto.

2. A zoom lens according to claim 1, wherein said zoom lens satisfies the following condition:

0.18<Da/DL1<0.45.

3. A zoom lens comprising, in order from an object side to an image side, a first lens unit of positive refractive power stationary during zooming, a second lens unit of negative refractive power, a third lens unit of positive refractive power stationary during zooming and a fourth lens unit of positive refractive power, zooming from a wide-angle end to a telephoto end being effected by axially moving said second lens unit toward the image side while axially moving said fourth lens unit to compensate for the shift of an image plane caused by the zooming, and focusing being effected by axially moving said fourth lens unit, wherein said first lens unit comprises, in order from the object side to the image side, (i) only one negative lens and (ii) at least two positive lenses, with one of said at least two positive lenses being adjacent to said negative lens, and wherein an air separation between said negative lens and said positive lens adjacent thereto is the widest in said first lens unit, said zoom lens satisfying the following condition:

0.15<Da/DL1<0.5 where DL1 is the length of said first lens unit along an optical axis, and Da is the air separation between said negative lens and said positive lens adjacent thereto.

4. A zoom lens according to claim 3, wherein said first lens unit comprises, in order from the object side to the image side, one negative lens and three positive lenses.

5. A zoom lens according to claim 4, satisfying the following conditions:

$-0.9 < \beta 2T/\sqrt{Z} < -0.3$ $-1.8<f2/FW<-1$ $0.4<f3/f4<1.2$ where β2T is an image magnification at the telephoto end of said second lens unit, Z is a zoom ratio, fi is a focal length of the i-th lens unit, and FW is a focal length at the wide-angle end of said zoom lens.

6. A zoom lens according to claim 4, satisfying the following conditions:

−0.1<FT/f123T<0.6

−7<f1/f2<−4

$0.2 < D34T/\sqrt{FW \cdot FT} < 0.5$ wherein FT is a focal length at the telephoto end of said zoom lens, FW is a focal length at the wide-angle end of said zoom lens, f123T is an overall focal length at the telephoto end from said first lens unit to said third lens unit, fi is a focal length of said i-th lens unit, and D34T is a space between said third lens unit and said fourth lens unit at the telephoto end when focus is made on an infinite object.

* * * * *

UNITED STATES PATENT AND TRADEMARK OFFICE
CERTIFICATE OF CORRECTION

PATENT NO. : 6,049,431

DATED : April 11, 2000

INVENTOR(S) : Nobuyuki TOCHIGI

It is certified that error appears in the above-identified patent and that said Letters Patent is hereby corrected as shown below:

COLUMN 2:

Line 11, "minimize" should read --minimizing-- .
Line 49, "of" should read --of keeping-- .

COLUMN 5:

Line 38, "($\beta$2W" should read --$\beta$2W--.

COLUMN 7:

Line 57, "vi" should read --vi--.

UNITED STATES PATENT AND TRADEMARK OFFICE
CERTIFICATE OF CORRECTION

PATENT NO. : 6,049,431

DATED : April 11, 2000

INVENTOR(S) : Nobuyuki TOCHIGI

Page 2 of 5

It is certified that error appears in the above-identified patent and that said Letters Patent is hereby corrected as shown below:

COLUMN 8:

Line 8, "osculating" should read --oscillating--.
Line 18, "v1" should read --ν1--.
Line 19, "v2" should read --ν2--.
Line 21, "v3" should read --ν3--.
Line 23, "v4" should read --ν4--.
Line 24, "v5" should read --ν5--.
Line 26, "v6" should read --ν6--.
Line 27, "v7" should read --ν7--.
Line 30, "v8" should read --ν8--.
Line 32, "v9" should read --ν9--.
Line 33, "v10" should read --ν10--.
Line 34, "v11" should read --ν11--.
Line 51, "v1" should read --ν1--.
Line 53, "v2" should read --ν2--.
Line 55, "v3" should read --ν3--.
Line 56, "v4" should read --ν4--.
Line 57, "v5" should read --ν5--.
Line 59, "v6" should read --ν6--.
Line 61, "v7" should read --ν7--.
Line 63, "v8" should read --ν8--.
Line 65, "v9" should read --ν9--.

UNITED STATES PATENT AND TRADEMARK OFFICE
CERTIFICATE OF CORRECTION

PATENT NO. : 6,049,431

DATED : April 11, 2000

INVENTOR(S) : Nobuyuki TOCHIGI

Page 3 of 5

It is certified that error appears in the above-identified patent and that said Letters Patent is hereby corrected as shown below:

COLUMN 9:

Line 3, "v10" should read --$v_{10}$--.
Line 5, "v11" should read --$v_{11}$--.
Line 22, "v1" should read --$v_1$--.
Line 24, "v2" should read --$v_2$--.
Line 25, "v3" should read --$v_3$--.
Line 26, "v4" should read --$v_4$--.
Line 28, "v5" should read --$v_5$--.
Line 30, "v6" should read --$v_6$--.
Line 32, "v7" should read --$v_7$--.
Line 34, "v8" should read --$v_8$--.
Line 35, "v9" should read --$v_9$--.
Line 37, "v10" should read --$v_{10}$--.
Line 39, "v11" should read --$v_{11}$--.
Line 55, "v1" should read --$v_1$--.
Line 57, "v2" should read --$v_2$--.
Line 59, "v3" should read --$v_3$--.
Line 60, "v4" should read --$v_4$--.
Line 62, "v5" should read --$v_5$--.
Line 64, "v6" should read --$v_6$--.
Line 65, "v7" should read --$v_7$--.

UNITED STATES PATENT AND TRADEMARK OFFICE
CERTIFICATE OF CORRECTION

PATENT NO. : 6,049,431

DATED : April 11, 2000

INVENTOR(S) : Nobuyuki TOCHIGI

Page 4 of 5

It is certified that error appears in the above-identified patent and that said Letters Patent is hereby corrected as shown below:

COLUMN 10:

Line 4, "v8" should read --$v8$--.
Line 6, "v9" should read --$v9$--.
Line 8, "v10" should read --$v10$--.
Line 9, "v11" should read --$v11$--.
Line 26, "v1" should read --$v1$--.
Line 28, "v2" should read --$v2$--.
Line 29, "v3" should read --$v3$--.
Line 31, "v4" should read --$v4$--.
Line 33, "v5" should read --$v5$--.
Line 34, "v6" should read --$v6$--.
Line 36, "v7" should read --$v7$--.
Line 37, "v8" should read --$v8$--.
Line 39, "v9" should read --$v9$--.
Line 41, "v10" should read --$v10$--.

UNITED STATES PATENT AND TRADEMARK OFFICE
CERTIFICATE OF CORRECTION

PATENT NO.  : 6,049,431
DATED       : April 11, 2000
INVENTOR(S) : Nobuyuki TOCHIGI It is certified that error appears in the above-identified patent and that said Letters Patent is hereby corrected as shown below:

COLUMN 11:

Line 15, "of" (first occurrence) should read --of keeping--.

Signed and Sealed this

Eighth Day of May, 2001

Attest:

NICHOLAS P. GODICI

Attesting Officer    Acting Director of the United States Patent and Trademark Office